FREQUENCY MULTIPLICATION METHOD AND SYSTEM
Filed Feb. 1, 1968
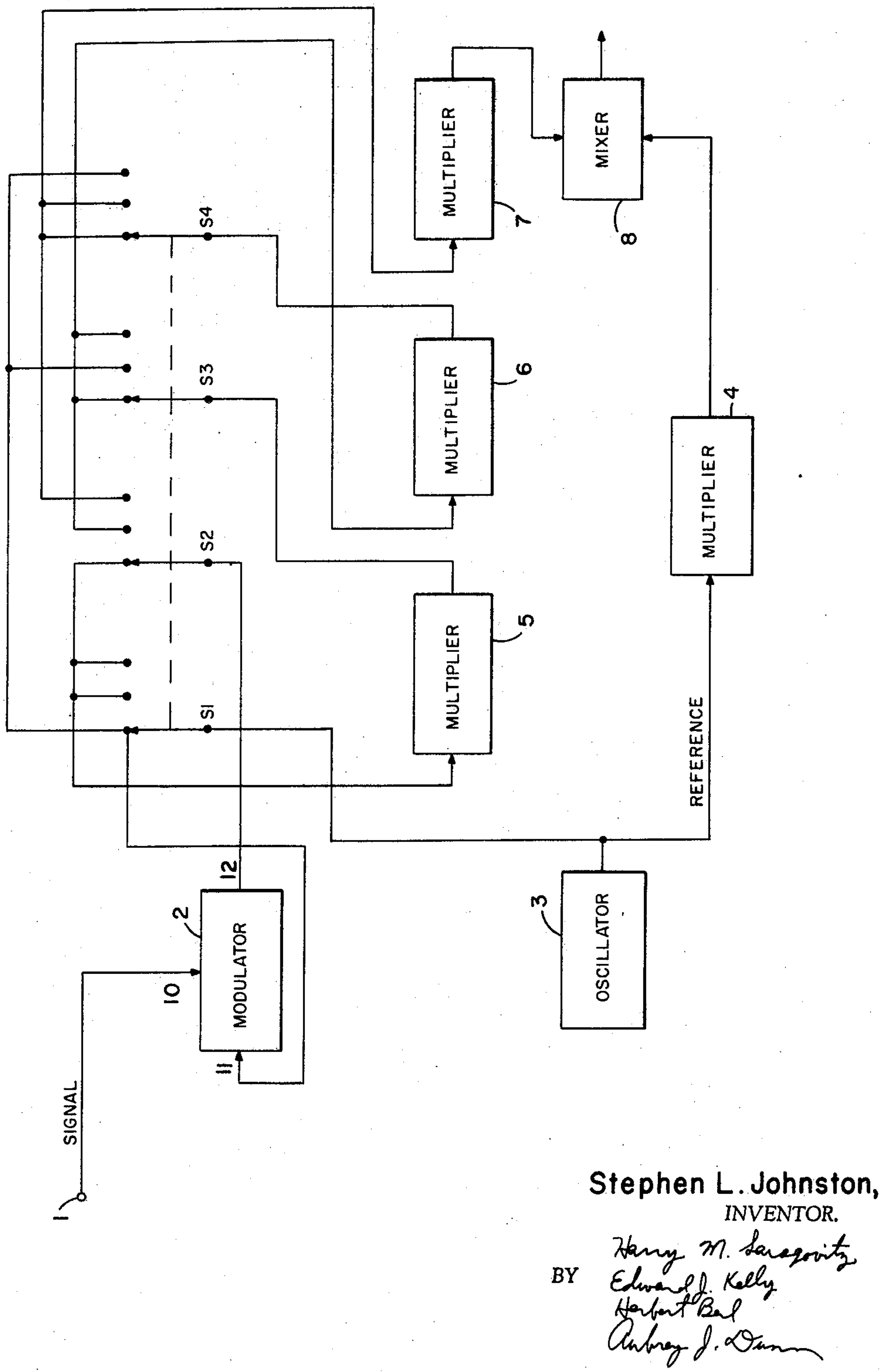
Stephen L. Johnston,
INVENTOR.
BY Harry M. Saragovitz
Edward J. Kelly
Herbert Berl
Aubrey J. Dunn United States Patent Office 3,487,290
Patented Dec. 30, 1969

3,487,290
FREQUENCY MULTIPLICATION METHOD AND SYSTEM

Stephen L. Johnston, Huntsville, Ala., assignor to the United States of America as represented by the Secretary of the Army Filed Feb. 1, 1968, Ser. No. 702,455
Int. Cl. H02m 5/02
U.S. Cl. 321—60 6 Claims

ABSTRACT OF THE DISCLOSURE

A signal to be multiplied is used to modulate a portion of the output of an oscillator. Both the modulated and unmodulated output portions of the oscillator are separately frequency multiplied, and the resulting frequency products are combined in a mixer. The mixer output is the original signal, multiplied in frequency by the same factor as the oscillator output portions. The multiplication factor of the original signal may be varied.

Dedicatory clause

The invention described herein may be manufactured, used, and licensed by or for the Government for governmental purposes without the payment to me of any royalty thereon.

Background of the invention

This invention is in the field of electronic frequency conversion, and may be employed to advantage in converting low-frequency, subsonic signals to sonic signals, or in measuring low-frequencies.

Summary of the invention

A method of and system for converting a low-frequency wave to a higher frequency. The wave modulates a portion of the output of an oscillator. Both the modulated output portion and the unmodulated portion of the oscillator are separately frequency multiplied. The frequency-multiplied waves are combined in a mixer. The mixer output is a frequency multiplied version of the original low-frequency wave.

An object of the invention is to provide a novel frequency-multiplying device.

Another object is to provide a novel method of multiplying the frequency of a signal.

Brief description of the drawing

The single drawing figure shows, in schematic form, the system of the invention, from which the inventive method may be practiced.

Description of the preferred embodiment

The system of the invention as shown in the drawing figure includes an input terminal 1, to which low-frequency waves are applied. Terminal 1 is connected to the signal input terminal 10 of an amplitude-modulator 2. An oscillator 3 is also provided, and is connected to the movable contact of switch S1. S1 has three fixed contacts, and is ganged to switches S2, S3, and S4, each of which includes a movable contact and three fixed contacts. Frequency-multipliers are provided. As is obvious from the drawing, modulator 2 and multipliers 5, 6, and 7 are so interconnected by switches S1–S4 that modulator 2 by way of carrier input terminal 11 and output terminal 12 may be electrically inserted in series between oscillator 3 and multiplier 5, or between multipliers 5 and 6, or between multipliers 6 and 7. The output of multiplier 7 is connected to mixer 8. The output of oscillator 3 is connected to multiplier 4, and the outputs of multipliers

4 and 7 combine in mixer 8. The output of mixer 8 is the frequency-multiplied signal. Multipliers 5–7 multiply the waves therethrough by the same factor (say $n$) that multiplier 4 multiplies the output of oscillator 3, but the multiplications of 5, 6 and 7 may be represented by $a$, $b$, and $c$ respectively, and $axbxc=n$. The factors $a$, $b$, and $c$ may or may not be equal, as desired. By the proper operation of switches S1–S4, the multiplication factor of the signal may be varied, without varying the multiplication of the portion of the output of oscillator 3 on which the signal is modulated.

From the previous description, the operation of the circuit should be substantially obvious. Signals to be multiplied are applied at terminal 1, and switches S1–S4 are set to the desired position. Oscillator 3 provides an output, which output has a portion modulated by the signals at 1, in modulator 2. Another portion of the output of 3 is applied directly to multiplier 4. The portion to be modulated may be frequency multiplied before or after being modulated, depending on the position of switches S1–S4. The modulated and frequency multiplied portion of the output of 3 is mixed with the unmodulated but multiplied portion from multiplier 4, and the result is a frequency-multiplied version of the original signal, with the multiplication factor dependent on the setting of switches S1–S4. The output of 3 may be considered a carrier wave.

The invention may be used to advantage not only for converting low-frequency signals to higher frequencies, but may be used to convert small frequency differences between signals to higher frequencies. The frequencies may be beat against each other, with the difference fed to the instant invention. Other advantages of the invention are that the signals may readily be multiplied by large intergers, and the intergers may be rapidly selected. Also, the invention is able to continuously cover a large range of frequencies. Moreover, the frequency multiplications of the invention are carried on in real time.

While a specific embodiment of the invention has been shown and described, obviously other embodiments may occur to one skilled in the art, in light of the instant disclosure. For example, more of less than three multipliers could be used in place of multipliers 5–7, depending on the particular signal requirements. Also, an individual modulator could be used for each multiplier, with means for switching the input signal between the modulators. Multiplier 4 may be replaced by plural multipliers, in similar manner to multipliers 5, 6 and 7. If this were done, other mixers could be used besides 8, and would be connected to the respective outputs of the multipliers in the signal and reference channels. Such other mixers could provide different multiplication factors from mixer 8, at their outputs.

What is claimed is:

1. A circuit for frequency-multiplying a signal including:
   - an oscillator having an output;
   - first and second frequency-multiplying means each having an input and an output;
   - a modulator having a signal input, a carrier input, and an output;
   - a mixer having two inputs and an output;

said signal connected to said signal input of said modulator, said oscillator output connected to said input of said first frequency-multiplying means, said modulator and said second frequency-multiplying means connected in series between said oscillator and one input of said mixer, said output of said first frequency-multiplier connected to the other input of said mixer.

2. The circuit as defined in claim 1 wherein said carrier input of said modulator is connected to said output of said oscillator.

3. The circuit as defined in claim 1 wherein said second frequency-multiplying means includes plural series-connected multipliers.

4. The circuit as defined in claim 3 wherein said carrier input and said output of said modulator are connected between two of said plural frequency multipliers.

5. A method of multiplying the frequency of a signal wave including the steps of:
- generating a carrier wave;
- modulating a first portion of said carrier wave with said signal wave;
- frequency multiplying a second portion of said carrier wave;
- frequency multiplying the modulated carrier wave; and
- combining the frequency-multiplied waves in a mixer, whereby the signal wave, frequency multiplied, appears as the output of said mixer.

6. The method as defined in claim 5 wherein the step of modulating said carrier wave follows the step of frequency-multiplying said first portion of said carrier wave.

References Cited

UNITED STATES PATENTS

| | | | |
|---|---|---|---|
| 2,416,791 | 3/1947 | Beverage | 325—431 |
| 2,505,043 | 4/1950 | Guanella | 325—434 X |
| 2,773,179 | 12/1956 | Makow | 325—431 |

LEE T. HIX, Primary Examiner

G. GOLDBERG, Assistant Examiner

U.S. Cl. X.R.

325—434; 332—42